United States Patent [19]

Cooperman et al.

[11] Patent Number: 4,805,196

[45] Date of Patent: Feb. 14, 1989

[54] LINE DELAY COMPENSATION FOR DIGITAL TRANSMISSION SYSTEMS UTILIZING LOW POWER LINE DRIVERS

[75] Inventors: Michael Cooperman, Framingham; Richard W. Sieber, Attleboro, both of Mass.

[73] Assignee: GTE Laboratories Incorporated, Waltham, Mass.

[21] Appl. No.: 43,871

[22] Filed: Apr. 29, 1987

[51] Int. Cl.⁴ ............................................. G05B 23/02
[52] U.S. Cl. ............................... 375/107; 340/825.14; 340/824.54; 375/13
[58] Field of Search ...................... 340/825.14, 825.54, 340/825.08; 342/30, 42; 455/51, 53; 375/12, 13, 106, 107; 370/103, 108

[56] References Cited

U.S. PATENT DOCUMENTS

| | | | |
|---|---|---|---|
| 4,218,654 | 8/1980 | Ogawa et al. | 375/107 |
| 4,562,573 | 12/1985 | Murano et al. | 370/108 |
| 4,604,618 | 8/1986 | Akiba et al. | 340/825.54 |
| 4,630,284 | 12/1986 | Cooperman | 375/36 |
| 4,638,473 | 1/1987 | Cooperman et al. | 370/27 |
| 4,648,123 | 3/1987 | Schrock | 340/825.54 |
| 4,709,401 | 11/1987 | Akerberg | 455/51 |

OTHER PUBLICATIONS

"Experimental Single-Chip PABX," IEEE Journal of Solid State Circuits, vol. SC-21, No. 2, Apr. 1986, pp. 247-251.

*Primary Examiner*—Benedict V. Safourek
*Attorney, Agent, or Firm*—Wolf, Greenfield & Sacks

[57] ABSTRACT

In a data transmission system including a central subsystem coupled by transmission lines of different lengths to a plurality of remote subsystems, methods and apparatus for synchronizing responses to messages transmitted by the central subsystem to compensate for different line delays are provided. The messages are transmitted by the central subsystem during the first portion of a frame, while the responses are transmitted by the remote subsystems during a second portion of the frame. In each of the remote subsystems, a compensation delay equal to a maximum line delay associated with the longest of the transmission lines less an actual line delay associated with the transmission line connected to that remote subsystem is determined. The response to the message is then delayed by the compensation delay so that the responses from each remote subsystem arrive at the central subsystem delayed by the maximum time delay. The central subsystem detects the response during a detection interval delayed by the maximum time delay after the end of the message.

13 Claims, 4 Drawing Sheets

LINE DELAY COMPENSATION FOR DIGITAL TRANSMISSION SYSTEMS UTILIZING LOW POWER LINE DRIVERS

FIELD OF THE INVENTION

This invention relates to telecommunication and data communication systems and, more particularly, to a line delay compensation technique for digital transmission systems which utilize transmission lines that are unterminated at the receiving end.

BACKGROUND OF THE INVENTION

Present day electronic private automatic branch exchanges (PABX's) are bulky, costly and consume considerable power. These shortcomings can be reduced dramatically by implementing the PABX in the latest VLSI technology. Recently, a single chip PABX which can provide voice and data service to 40 subscribers and that can be interconnected to form a larger PABX system has been developed. The single chip PABX is described by M. Cooperman et al in "Experimental Single Chip PABX," IEEE Journal of Solid State Circuits, Vol. SC-21, No. 2, April 1986, pp. 247-251 and in U.S. Pat. No. 4,630,284 issued Dec. 16, 1986. The single chip PABX system utilizes digital communication for both voice and data between a central switch, the local single chip PABX, telephones and data terminals. The connection between each telephone and the local PABX utilizes twisted pair wiring operating in the time division duplex mode.

Although VLSI circuits can perform highly complex functions with extremely small geometries, they are very limited in power dissipation. Conventional digital line driving techniques employ terminations at the receiving end to prevent reflections. The line driver transistor geometry must be large and the driver must deliver several hundred milliwatts to the termination load. In order to integrate the line driving and line receiving functions into the single chip PABX, transmission lines that are unterminated at the receiving end are utilized. As a result of the interaction between the transmitted and reflected waveforms, power is dissipated only during logic transitions. The power averages ten milliwatts per line driver for a data rate of 310 kilobits per second and a maximum line length of 400 feet.

The single chip PABX system utilizes a communication protocol in which the PABX chip looks for the first bit of a response during a specified time interval. Asynchronous receivers can be eliminated because the distance is short and the bits arrive with enough predictability to be recovered. In order for transmitted messages and received responses to remain synchronized, transmission line delay cannot exceed the duration of one bit. If the line delay exceeds one bit, the receiving end is not able to determine which bit of a response is being received at a given time. Accordingly, the line length for a given data rate is limited.

For a PABX system, 40 phones are typically located within 400 feet of the PABX chip. However, it is desirable in some circumstances to operate the single chip PABX system over longer distances. A typical application of the system is in a small building or a department in a larger building. It cannot always be insured that the maximum distance will be 400 feet. In addition, the PABX chip can be utilized in the public telephone network where the distance between 40 phones is likely to be well in excess of 400 feet. Operation over longer distances can be achieved by reducing the data rate. However, this slows the operating speed of the system.

It is a general object of the present invention to provide improved methods and apparatus for data communication.

It is another object of the present invention to provide methods and apparatus for synchronizing responses to compensate for different line delays in a data communication system.

It is yet another object of the present invention to provide a low power telecommunication system having the capability to operate over relatively long distances.

It is still another object of the present invention to provide a telecommunication system adapted for integration on one or a few integrated circuit chips.

SUMMARY OF THE INVENTION

The present invention relates to a data transmission system including a central subsystem coupled by transmission lines of different lengths to a plurality of remote subsystems and means for transmitting messages from the central subsystem to the remote subsystems. According to the present invention, the above and other objects and advantages are achieved in apparatus for synchronizing responses to the messages to compensate for different line delays on the transmission lines. The apparatus comprises first means located in each remote subsystem for determining a compensation delay equal to a maximum line delay associated with the longest of the transmission lines less an actual line delay associated with the transmission line connected to that remote subsystem, and second means for delaying the sending of the response from the remote subsystem by the compensation delay, whereby the response arrives at the central subsystem delayed relative to a reference time by the maximum line delay. Thus, all responses are received at the central subsystem delayed by the maximum line delay even though the actual line delays are different. The central subsystem includes means for detecting the response during a detection interval delayed relative to the reference time by the maximum line delay.

The first means for determining a compensation delay can include means for transmitting a test signal on the transmission line from the remote subsystem to the central subsystem and means for measuring a delay interval between the start of the test signal and the arrival of a reflected test signal. The delay interval defines the actual line delay.

According to another aspect of the invention, there is provided a method for synchronizing messages transmitted from the central subsystem and responses transmitted from the remote subsystem to compensate for different line delays on the transmission lines. The method comprises the steps of (1) determining a maximum line delay associated with the longest of the transmission lines; (2) at each of the remote subsystems, determining an actual line delay associated wih the transmission line connected to that remote subsystem; and (3) at each of the remote subsystems, delaying the response to the message from the central subsystem by a compensation delay equal to the maximum line delay less the actual line delay. As a result, the response arrives at the central subsystem delayed relative to a reference time by the maximum line delay, regardless of the actual line delay.

BRIEF DESCRIPTION OF THE DRAWINGS

For a better understanding of the present invention together with other and further objects, advantages and capabilities thereof, reference is made to the accompanying drawings which are incorporated herein by reference and in which.

DETAILED DESCRIPTION OF THE INVENTION

Figure 1:
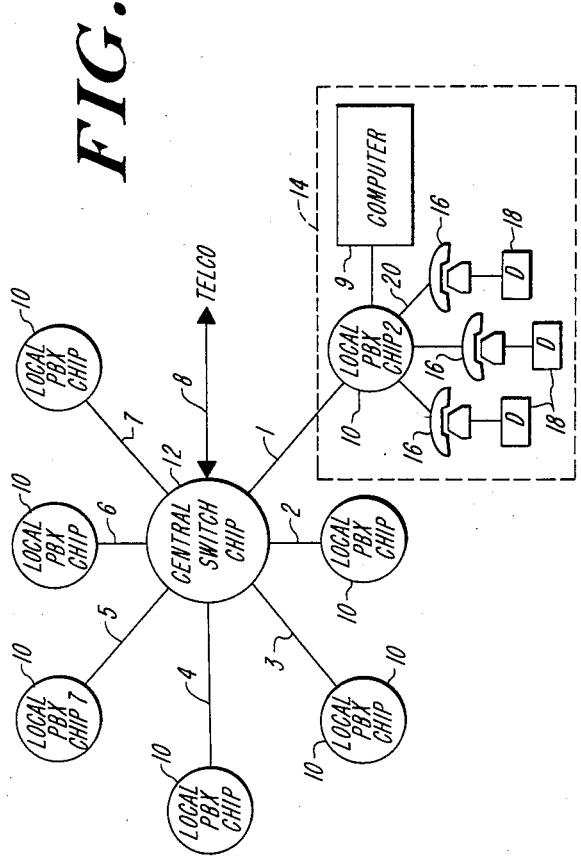
FIG. 1 is a schematic block diagram of a digital transmission system suitable for incorporation of the present invention.

A digital transmission of the system suitable for incorporation of the line delay compensation technique of the present invention is shown in FIG. 1. A central switch 12 communicates over serial transmission lines and performs such functions as storage and switching of signal information to different local PABX systems and to the telephone company equipment. Central switch 12 is interconnected with a plurality of local PABX systems 14, each of which includes a local PABX chip 10 and up to 40 telephone/data terminals 16 and 18, three of which are shown in FIG. 1. The communication links, or trunk lines 1–7, between the central switch 12 and the local PABX chips 10, and the trunk line 8 between the central switch chip 12 and the telephone company equipment, may be conventional two-wire transmission lines or, preferably, fiber optic communication links, which provide a substantially noise-free communication link with wide bandwidth.

Each local PABX chip 10 is a self-contained unit capable of providing multiplexing, storage and signal processing for up to 40 telephone/data terminals 16, 18. The voice signal from the microphone of telephone 16 is converted by conventional means to a standard pulse code modulated (PCM) bit stream of 64 kilobytes per second and is combined with data from data terminal 18 for transmission over a single twisted pair of wires 20 to the local PABX chip 10. Voice or data communication over trunk line 1 to the central switch 12 is TDM digital. All activated transmission lines 20 provide communication with the local PABX chips 10 once every frame.

Figure 2:
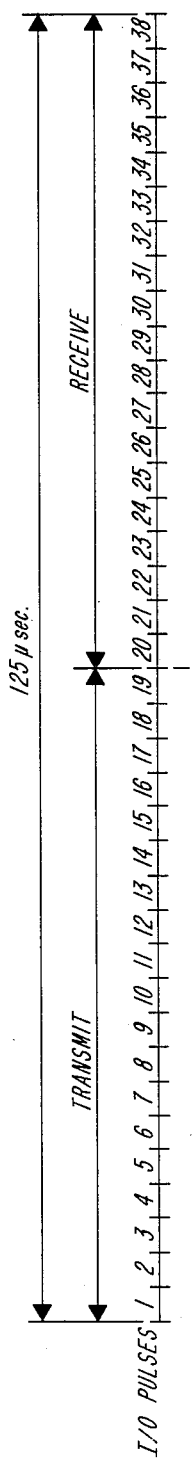
FIG. 2 is a timing diagram illustrating the data transmission format used in the local PABX system of FIG. 1.

As shown in FIG. 2, each frame is 125 microseconds in duration, corresponding to the standard 8 KHz sampling frequency. The message format for each one-way communication between the local PABX chip 10 and each telephone/data terminal 16, 18 consists of a start bit, eight voice bits, eight data bits, one signalling bit and one stop bit for a total of nineteen bits. As shown in FIG. 2, a 125 microsecond frame includes a nineteen bit transmit portion followed by a nineteen bit receive portion. Information flows from the PABX chip 10 to the telephone/data terminals 16, 18 during the transmit portion of each frame and in the reverse direction during the receive portion of each frame.

Figure 3:
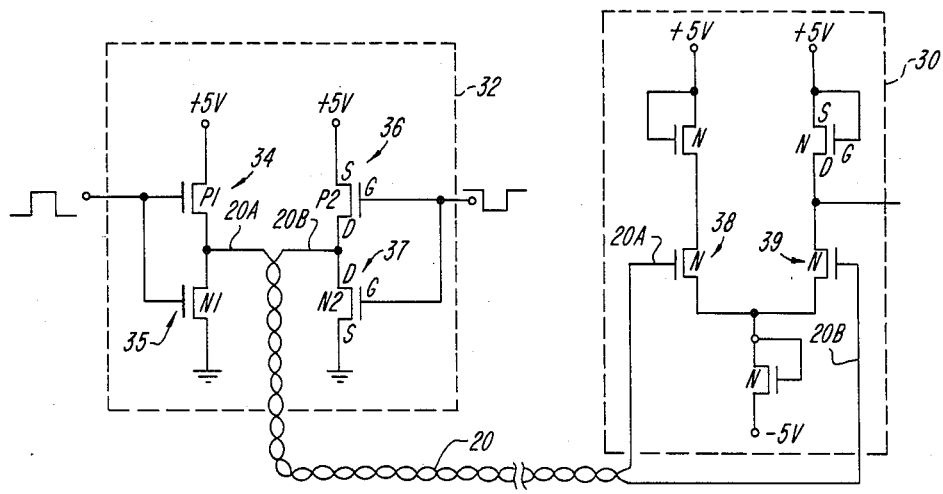
FIG. 3 is a schematic diagram illustrating a line driver and a line receiver suitable for use in the present invention.

A low power differential driver and differential receiver suitable for digital transmission in the system of FIG. 1 are illustrated in FIG. 3. A differential receiver 30 is located at the receiving end, and a differential driver 32 is located at the sending end. It is to be understood that two ends are interchangeable.

The differential driver 32 consists of a first P/N MOS transistor pair 34, 35 and a second P/N MOS transistor pair 36, 37. The source terminals of transistor 34 and 36 are coupled to +5V, and the source terminals of transistors 35 and 37 are coupled to ground. Twisted wire transmission line 20 has one wire 20a coupled to the drain terminals of transistors 34 and 35 while the drain terminals of transistors 36 and 37 are coupled to the other wire 20b. The information bit stream is coupled to gate terminals of transistors 34 and 35 and the inverted bit stream is coupled to the gates of transistors 36 and 37, thereby differentially driving the transistor pairs and hence, the transmission line 20. The receiving end of the transmission line 20 is coupled to the gates of MOS transistors 38, 39 which present a high input impedance, thus effectively providing an open circuit at the receiving end.

The characteristic impedance $Z_o$ of transmission line 20 is typically 100 ohms. The transistor pair geometries are selected to provide a drain-source resistance of $\frac{1}{2} Z_o$, or 50 ohms. The line driver 32 has a source impedance of 100 ohms matched to the line impedance $Z_o$, and the transmission line 20 is thus terminated at the sending end. The low power digital transmission system shown in FIG. 3 is described in more detail in U.S. Pat. No. 4,630,284 issued Dec. 16, 1986 which is hereby incorporated by reference.

Figure 4:
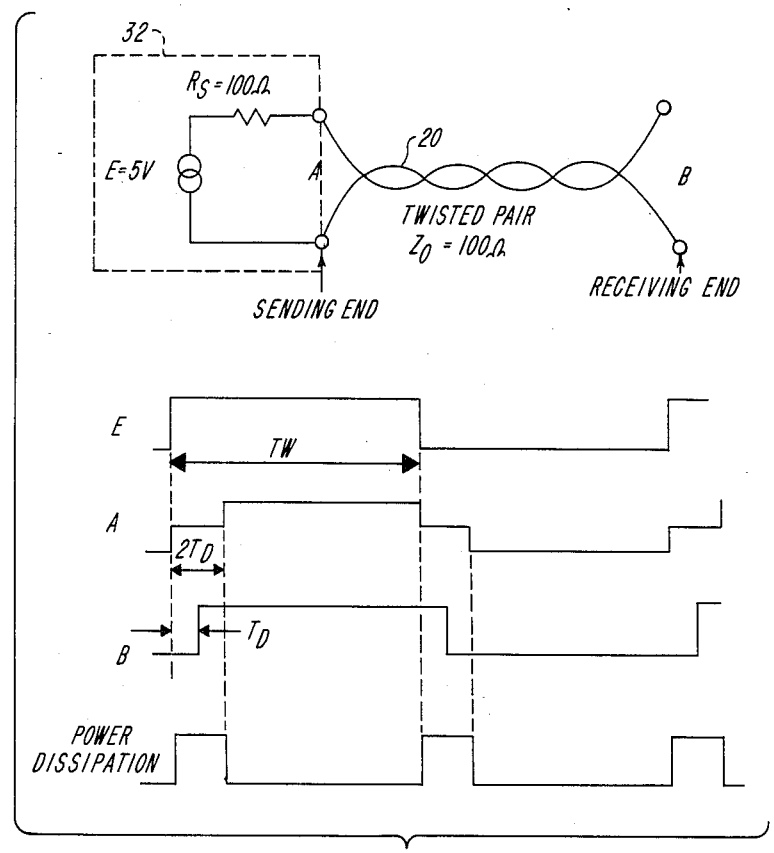
FIG. 4 illustrates the digital transmission scheme and associated waveforms for the circuit of FIG. 3.

An equivalent circuit of the transmission system of FIG. 3 is shown in FIG. 4 with associated waveforms. The transmission line 20 is terminated with its characteristic impedance $Z_o$ at the sending end A and is effectively open circuited at the receiving end B. In FIG. 4, the one-way transit time for a signal sent from the sending end A to the receiving end B is $T_D$ and the round trip transit time, or line delay, for the transmitted signal to be sent and reflected back to the driver is $2T_D$. The waveforms of FIG. 4 illustrate a typical transmitted signal E starting at time $t=0$. For time $t<2T_D$, the transmission line 20 appears infinitely long to driver 32, causing only half of the driver voltage E to be applied to the line 20. This is because the output impedance seen by the driver 32 during time period $t<2T_D$ is $Z_o$. A 2:1 attenuator is formed by the line impedance $Z_o$ and the internal impedance of driver 32. Thus, for time $t<2T_D$, the voltage at the sending end A is E/2 as shown in curve A of FIG. 4.

When the voltage E/2 arrives at the receiving end B at time $t=T_D$, the open circuit at the receiver end causes the line voltage to double to E and return to the sending end as shown in curve B of FIG. 4. Then, when the reflection from the receiving end arrives at the sending end a $t=2T_D$, the transmission line voltage at that end becomes E, reducing the current and power into the line to zero, since current cannot flow without a voltage difference across the line. The resulting waveform at the sending end A includes a step of duration equal to $2T_D$ and of amplitude equal to one-half the source voltage E.

The present invention makes use of the step in waveform A of FIG. 4 to compensate for line delay so that synchronized operation can be maintained over long distances. Referring again to FIG. 2, it is seen that in the preesnt example a complete frame is 125 microseconds and that the frame is divided into a transmit portion and a receive portion. During the transmit portion, the local PABX chip 10 transmits a 19-bit message to the telephone 16; during the receive portion, the telephone 16 transmits a 19-bit response to the PABX chip 10. Each bit in the transmit message and in the response is approximately 3.2 microseconds in duration. The synchronization problem arises when the round trip transit time $2T_D$ is greater than 1 bit time. The PABX chip 10 does not include an asynchronous receiver but instead looks for the first bit of the response from the telephone 16 during time slot 20 (FIG. 2). If the response is delayed due to line delay by more than 3.2 microseconds, the first bit of the response falls in time slot 21 or later. Thus, the bits of the response are improperly loaded into the PABX chip 10 with no indication that this has occurred, causing the PABX chip 10 and the telephone 16 to lose synchronization.

The round trip delay for a twisted pair transmission line of 400 feet is approximately 1.6 microseconds. Thus, the first bit of the response is received by the PABX chip 10 during time slot 20 for any transmission line of 400 feet or less. However, if the maximum line length is 800 feet or more, the round trip delay is approximately 3.2 microseconds and the first bit of the response can fall in time slot 21, thereby losing synchronization. Synchronization can be preserved over longer distances by increasing the time duration of each time slot. However, this is undesirable because the data rate is decreased and the system operating speed is correspondingly reduced.

In accordance with the present invention, the line delay which can cause the system to lose synchronization is compensated for by a technique which includes measuring the actual line delay $2T_D$ associated with the transmission line 20 connected to each telephone 16. In addition, a maximum line delay $2T_M$ associated with the longest transmission line in the system or with the longest practical transmission line which can be used in the system is determined. When a response to a message is transmitted by the telephone 16, it is delayed by a compensation delay $T_C$ equal to the maximum line delay $2T_M$ less the actual line delay $2T_D$ on the particular line. Thus, $T_C + 2T_M - 2T_D$. The compensation delay insures that the response arrives at the PABX chip 10 a predetermined time afer a message is transmitted, regardless of the line length. All telephones 16 appear to the PABX chip 10 as if they are at the maximum distance, and all responses arrive at the PABX chip 10 delayed by the maximum line delay $2T_M$ relative to a reference time, such as the end of the message. The PABX chip 10 is preprogrammed to receive each response delayed by $2T_M$, and synchronization is maintained.

The actual line delay $2T_D$ is determined by measuring the duration of the step in waveform A of FIG. 4 as described in detail hereinafter The maximum line delay $2T_M$ is a fixed value corresponding to the line delay for the maximum transmission line length permitted in the system and can be measured or calculated in advance. Its value is a constant for the system.

The actual line delay $2T_D$ is preferably measured during a startup period or a calibration period. The value is then stored in the telephone 16 circuitry and utilized to delay the response during normal operation. By way of example, assume that the maximum line length is 2,000 feet and that the corresponding maximum line delay $2T_M$ is approximately 8 microseconds. Then, for a telephone 16 at a distance of 1,500 feet from the PABX chip 10, the actual line delay $2T_D$ is approximately 6 microseconds and the response is delayed by a compensation delay $T_C$ of 2 microseconds to cause the response to arrive at the PABX chip 10 delayed by 8 microseconds. When the telephone 16 is connected to a transmission line 20 of maximum length equal to 2,000 feet, the actual line delay $2T_D$ is 8 microseconds and the compensation delay $T_C$ is zero. When the telephone 16 is close to the PABX chip 10, the actual line delay $2T_D$ is approximately zero and the compensation delay is a full 8 microseconds. As a result, responses from telephones 16 connected by transmission lines 20 of different lengths are all delayed by 8 microseconds and all arrive at the PABX chip 10 at a predetermined time after the message is transmitted.

The compensation technique of the present invention usually requires that the maximum line delay $2T_M$ be incorporated into the 125 microsecond frame duration, since the frame duration must be maintained constant. The frame duration is maintained constant at 125 microseconds by increasing the data rate in the message and the response. In the above example, the 8 microsecond maximum line delay reduces the time available for message and response from 125 microseconds to 117 microseconds and reduces the bit duration from about 3.2 microseconds to about 3.0 microseconds. Alternatively, if the circumstances permit the frame duration to be increased above 125 microseconds to accommodate the maximum line delay, the data rate in the message and the response can be maintained constant.

Figure 5:
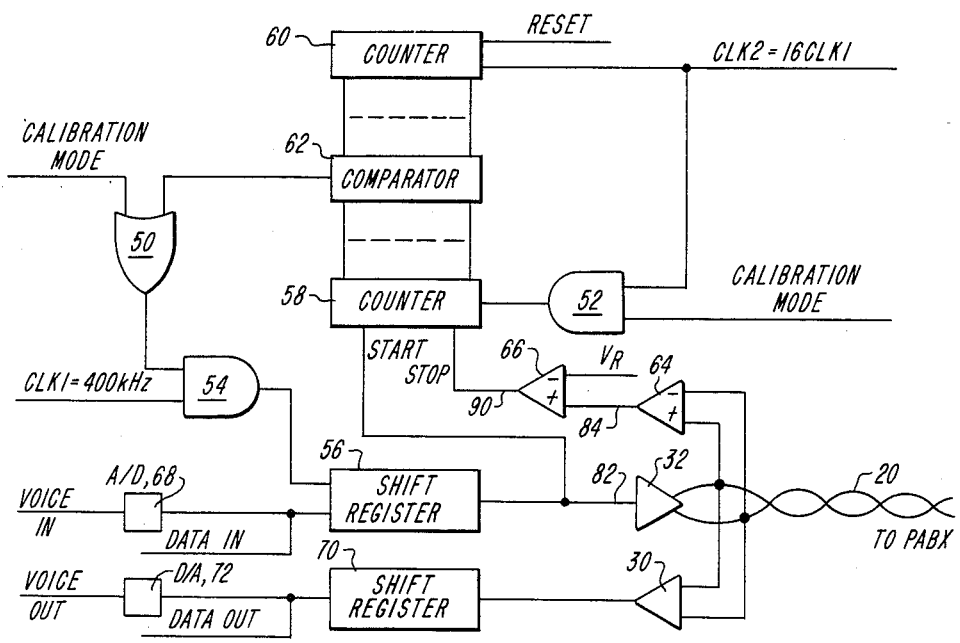
FIG. 5 is a schematic block diagram of a circuit for implementing the synchronization technique of the present invention.

A block diagram of circuitry for performing the line delay compensation described above is shown in FIG. 5. A calibration mode signal is coupled to one input of an OR gate 50 and to one input of an AND gate 52. The output of OR gate 50 is coupled to one input of an AND gate 54. A first clock signal, typically at 400 KHz, is coupled to the other input of AND gate 54. The output of AND gate 54 is coupled to the shift input of a transmit shift register 56. The serial output of shift register 56 is coupled through differential driver 32 to transmission line 20 and is also coupled to the start input of a binary counter 58. A second clock signal at 16 times the rate of the first clock signal is coupled to the other input of AND gate 52 and to the clock input of a binary counter 60. The output of AND gate 52 is coupled to the clock input of counter 58. The outputs of counters 58 and 60 are coupled to the two sets of inputs of a comparator 62. The output of comparator 62, which indicates that the two binary inputs are equal, is coupled to the other input of OR gate 50. The transmission line 20 is coupled through a differential to single-ended converter 64. The output of converter 64 is coupled to one input of a threshold detector 66. The other input of threshold detector 66 is supplied with a reference voltage $V_R$. The output of threshold detector 66 is coupled to the stop input of counter 58. Voice input from the telephone is supplied through an analog-to-digital coverter 68 to transmit shift register 56. The transmission line 20 is coupled through receiver 30 to a receive shift register 70. Outputs of receive shift register 70 provide a data output directly and a voice output through a digital-to-analog converter 72.

Figure 6:
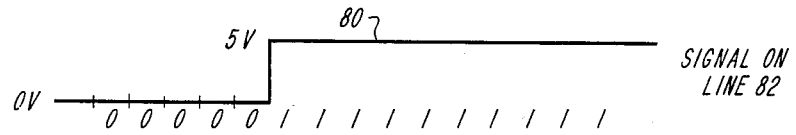
FIG. 6 is a timing diagram illustrating the operation of the circuit of FIG. 5.
Figure 6:
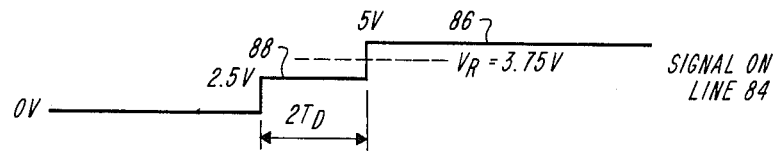
Figure 6:
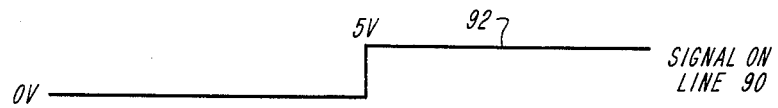

During installation or during later calibration of the system, the calibration mode inputs to gates 50 and 52 are activated and the transmit shift register 56 is caused to transmit a test signal used to determine actual line delay $2T_D$. The test signal is typically a pulse and must have a duration longer than the maximum line delay $2T_M$ in the system. An exemplary test signal comprising a series of zeros followed by a series of ones is shown in waveform 80 of FIG. 6. Conventional gating circuitry (not shown) is used to gate the test signal, rather than voice and data, into the transmit shift register 56 during the calibration mode. The waveform 80 appears on line 82 in FIG. 5. Prior to transmission of the test signal, counter 58 is preset with a count which represents the maximum line delay $2T_M$ in the system. The leading edge of the test signal starts counter 58 decrementing from the preset value of maximum line delay $2T_M$.

The converter 64 senses the waveform at the sending end of transmission line 20. The output 84 of converter 64 is represented as waveform 86 in FIG. 6. As described above, the sending end waveform includes a step 88 equal in duration to the actual line delay $2T_D$ and having an amplitude equal to one-half of the transmitted voltage when the source impedance is equal to the characteristic impedance of the transmission line 20. In the present example, the transmitted voltage is 5 volts, and the step 88 voltage is 2.5 volts. The end of the step 88, which indicates the arrival of the reflected signal, is detected by sensing the increase in voltage of waveform 86 from 2.5 volts to 5 volts. The transition from step 88 voltage to full voltage is detected by threshold detector 66 which has a reference voltage $V_R$ between 2.5 and 5 volts, typically 3.75 volts. Thus, when waveform 86 increases in voltage from 2.5 volts to 5 volts, output 90 of threshold detector 66 changes state as represented by waveform 92 in FIG. 6. The output 90 of threshold detector 66 is utilized to stop counter 58. The binary number now stored in counter 58 represents the compensation delay $T_C$ for the response since the counter 58 has been decremented from a count representing the maximum line delay $2T_M$ by a count representing the actual line delay $2T_D$.

In the operation mode, when the PABX chip 20 and the telephone 16 are transmitting voice and data, the counter 60 is reset at the end of a message from the PABX chip 10 (the end of count 19 in FIG. 2) and counting up is enabled. When counter 60 reaches a count equal to the count stored in counter 8, the comparator 62 provides an output signal which enables OR gate 50. The OR gate 50 enables AND gate 54 to supply the first clock signal to the shift register 56 and to start transmission of the response to the PABX chip 10. Thus, the response is delayed by a time equivalent to the count stored in counter 58.

Figure 7:
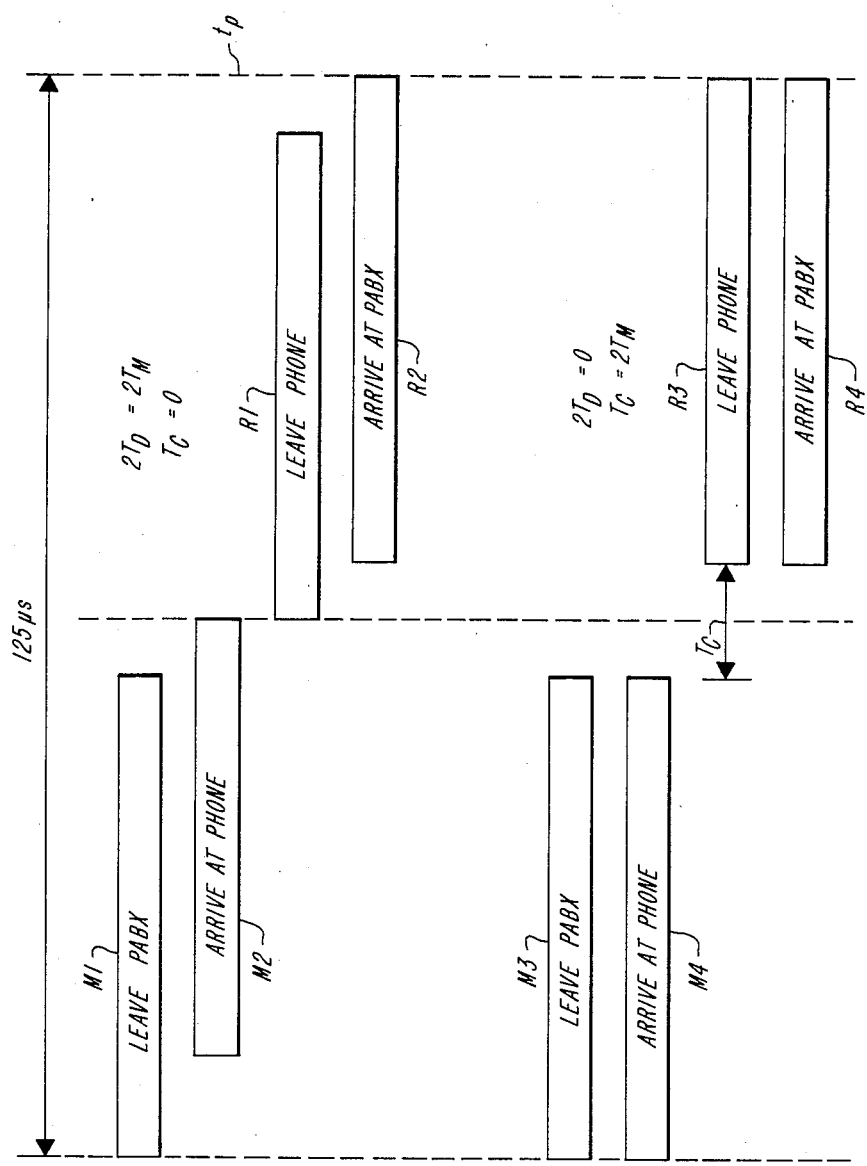
FIG. 7 is a timing diagram illustrating line delay compensation in accordance with the present invention.

The operation of the line delay compensation technique is described with reference to FIG. 7. The message and response portions of a frame are illustrated with respect to time. Example 1 illustrates the case of maximum line length, while example 2 illustrates the case of zero line length. In example 1, M1 represents a message as it is transmitted from PABX chip 10, while M2 represents the same message as it arrives at telephone 16 delayed by the maximum line delay $T_M$. At the end of message M2, response R1 is transmitted by telephone 16. The response arrives at the PABX chip 10 at time $t_p$ as shown at R2 with a further maximum line delay $T_M$. Since the actual line delay is the maximum line delay, no compensation delay of the response is necessary.

Example 2 illustrates the case of zero line length transmission line and therefore zero line delay. (Although zero line length is not a practical situation, it is illustrated as a limiting case.) Message M3 leaves PABX chip 10 and arrives at the telephone 16 as message M4 at essentially the same time without line delay. In this case, response R3 is delayed by a compensation delay equal to the maximum time delay $T_C=2T_M$, and as a result, response R4 arrives at the PBX chip at time $t_p$. For an intermediate line length, the response is delayed by a compensation delay $T_C$ in the range between zero and $2T_M$ to insure that the response arrives at the PABX chip 10 at the time $t_p$ regardless of the transmission line delay. Since the PABX chip 10 looks for the response during a time interval centered on $t_{p'l}$, *synchronism is maintained in spite of line delays of varying length.*

While there has been shown and described what is at present considered the preferred embodiments of the present invention, it will be obvious to those skilled in the art that various changes and modifications may be made therein without departing from the scope of the present invention as defined by the appended claims.

We claim:

1. In a system including a central subsystem coupled by transmission lines of different lengths to a plurality of remote subsystems and means for transmitting messages from the central subsystem to the remote subsystems, apparatus for synchronizing responses to the messages to compensate for different line delays on the transmission lines comprising:

first means located in each of the remote subsystems for determining an actual line delay associated with the transmission line connected to that remote subsystem and for determining a compensation delay equal to a preprogrammed maximum line delay associated with the longest of the transmission lines less said actual line delay; and second means located in each of the remote subsystems for delaying the response to the message from the central subsystem by the compensation delay, whereby the response arrives at the central subsystem delayed relative to a reference time by the maximum line delay.

2. Synchronizing apparatus as defined in claim 1 wherein said first means includes means for transmitting a test signal on the transmission line from said remote subsystem to said central subsystem, and means for measuring a delay interval between the start of test signal and the arrival of a reflected test signal, said delay interval defining the actual line delay.

3. Synchronizing apparatus as defined in claim 1 wherein said first means includes means for transmitting a test signal on the transmission line from said remote subsystem to an unterminated receiving end at said central subsystem;

counting means and means for presetting said counting means with a count representing said maximum line delay; and means for decrementing said counting means between the start of said test signal and the arrival of the reflected test signal, whereby said counting means is decremented by said actual line delay from said maximum line delay to said compensation delay.

4. Synchronizing apparatus as defined in claim 2 wherein said measuring means includes means for detecting the duration of a step in said test signal, said step having a duration equal to the time for said test signal to travel to said central subsystem and to be reflected back to said remote subsystem.

5. In a system including a central subsystem coupled by transmission lines of different lengths to a plurality of remote subsystems, a method for synchronizing messages transmitted from the central subsystem and responses transmitted from the remote subsystems to compensate for different line delays on the transmission lines, the method comprising the steps of:

at each of the remote subsystems, determining an actual line delay associated with the transmission line connected to that remote subsystem and determining a compensation delay equal to a preprogrammed maximum line delay associated with the longest of the transmission lines less said actual line delay; and at each of the remote subsystems, delaying the response to the message from the central subsystem by said compensation delay, whereby the response arrives at the central subsystem delayed relative to a reference time by the maximum line delay.

6. A synchronizing method as defined in claim 5 wherein the step of determining an actual line delay includes the steps of transmitting a test signal on the transmission line from said remote subsystem to said central subsystem; and measuring a delay interval between the start of the test signal and the arrival of a reflected test signal, said delay inteval defining the actual line delay.

7. A synchronizing method as defined in claim 5 wherein the step of determining an actual line delay includes the steps of transmitting a test signal on the transmission line from the remote subsystem to an unterminated receiving end at the central subsystem;

presetting a counting means with a count repesenting said maximum line delay; and decrementing the counting means between the start of the test signal and the arrival of a reflected test signal, whereby the counting means is decremented by the actual line delay from the maximum line delay to said compensation delay.

8. A synchronizing method as defined in claim 6 wherein the step of measuring a delay interval includes the step of detecting the duration of a step in the test voltage transmitted on the transmission line, the step having a duration representing the round-trip transmit time of said test signal on said transmission line.

9. In a system including a central subsystem coupled by transmission lines of different lengths to a plurality of remote subsystems and means for transmitting messages from the central subsystem to the remote subsystems, apparatus for synchronizing responses to the messages to compensate for different line delays on the transmission lines comprising:

first means located in each of the remote subsystems for determining an actual line delay associated with the transmission line connected to that remote subsystem and for determining a compensation delay equal to a preprogrammed maximum line delay associated with the longest of the transmission lines less actual line delay;

second means located in each of the remote subsystems for delaying the response to the message from the central subsystem by the compensation delay, whereby the response arrives at the central subsystem delayed relative to a reference time by the maximum line delay; and third means located at the central subsystem for detecting said response during a detection interval delayed relative to said reference time by the maximum line delay.

10. Synchronizing apparatus as defined in claim 9 wherein said first means includes means for transmitting a test signal on the transmission line from said remote subsystem to said central subsystem, and means for measuring a delay interval between the start of the test signal and the arrival of a reflected test signal, said delay interval defining the actual line delay.

11. Synchronizing apparatus as defined in claim 9 wherein said first means includes means for transmitting a test signal on the transmission line from said remote subsystem to an unterminated receiving end at said central subsystem;

counting means and means for presetting said counting means with a count representing said maximum line delay; and means for decrementing said counting means between the start of said test signal and the arrival of the reflected test signal, whereby said counting means is decremented by said actual line delay from said maximum line delay to said compensation delay.

12. Synchronizing apparatus as defined in claim 10 wherein said measuring means includes means for detecting the duration of a step in said test signal, said step having a duration equal to the time for said test signal to travel to said central subsystem and to be reflected back to siad remote subsystem.

13. In a system including a central subsystem coupled by transmission lines of different lengths to a plurality of remote subsystems, a method for synchronizing messages transmitted from the central subsystem and responses transmitted from each of the remote subsystems to compensate for different line delays on the transmission lines, the method comprising the steps of:

at each of the remote subsystems, determining an actual line delay associated with the transmission line connected to that remote subsystem and determining a compensation delay equal to a preprogrammed maximum line delay associated with the longest of the transmission lines less said actual line delay;

at each of the remote subsystems, delaying the response to the message from the central subsystem by the compensation delay, whereby the response arrives at the central subsystem delayed relative to a reference time by the maximum line delay; and at the central subsystem, detecting the response during a detection interval delayed relative to said reference time by the maximum line delay.

\* \* \* \* \*